Patented June 25, 1946

2,402,683

UNITED STATES PATENT OFFICE 2,402,683

HYDROGENATION CATALYSTS AND METHODS OF PREPARATION

Frank Kerr Signaigo, Wilmington, Del., assignor to E. I. du Pont de Nemours & Company, Wilmington, Del., a corporation of Delaware No Drawing. Application February 16, 1940, Serial No. 319,241

11 Claims. (Cl. 252—228.4)

This invention relates to metal sulfide catalysts for use in hydrogenation reactions and to methods of preparing such catalysts.

The literature on the use of metal sulfide catalysts for the destructive hydrogenation of carbonaceous materials is very extensive. Such metal sulfides are prepared by a variety of methods such as precipitation, decomposition of thio salts, and heating metals or metal compounds with volatile sulfur-containing materials such as sulfur, hydrogen sulfide, carbon bisulfide, mercaptans, etc. The formation of these sulfides has been accomplished by heating the metals in the presence of the sulfur containing materials to relatively high temperatures such as those between 150° to 700° C. The standard inorganic reference books state in effect that iron, cobalt, nickel, molybdenum, etc., do not react with hydrogen sulfide or sulfur at lower temperatures.

The metal sulfide catalysts described in the literature are active for the destructive hydrogenation of carbonaceous materials and for the desulfurization of petroleum and gases at high temperature, as for example 300° to 600° C. These drastic conditions of temperature are not suitable for carrying out certain desirable hydrogen reductions of organic compounds, since extensive cracking and hydrogenolysis results and mixtures of hydrocarbons are obtained. It is therefore essential to the successful hydrogen reduction of many organic sulfur compounds that the catalysts employed be active at low temperatures so that simple addition of hydrogen or cleavage by hydrogen will occur without accompanying disruptive side reactions. The catalyst must of course be immune to sulfur poisoning if sulfur or sulfur compounds are involved.

This invention has as an object the preparation of certain new and useful sulfactive catalysts. A further object is to prepare certain new and useful catalysts for effecting hydrogenation reactions. A still further object is the preparation of hydrogenation catalysts that are active under mild conditions of temperature. Another object is to develop certain new processes for the production of such catalysts. Other objects will be apparent from the reading of the following description of the invention.

These objects are accomplished by the following invention which comprises treating a finely divided metal in activated or pyrophoric form with a sulfiding agent under conditions such that the heat of reaction is removed at such a rate that the temperature of the reactants is prevented from rising to a point where the activity of the resulting catalyst is adversely affected. Generally, the sulfidation is carried out at temperatures below 150° C. and preferably below 100° C. When the sulfiding agent is sulfur, this is conveniently dissolved in a suitable solvent which is stirred with the finely divided active metal until no further reaction occurs, and when it is hydrogen sulfide, this is passed thru a suspension of the finely divided metal in a solvent for hydrogen sulfide.

Example I

An active hydrogenation catalyst was prepared as follows. Anhydrous cobalt chloride was suspended in dimethyl glycol ether containing dissolved naphthalene. Two gram atoms of sodium for each mole of cobalt chloride were added in portions during two hours, the temperature of the solution being maintained in the range from 0–25° C. The green solution of sodium naphthalene that formed immediately reacted with the cobalt chloride to precipitate finely divided cobalt metal and sodium chloride. The insoluble cobalt metal and sodium chloride were filtered from the solvent and washed with fresh solvent to remove the naphthalene and thereafter washed with water to remove the sodium chloride. The resulting finely divided black cobalt powder was very pyrophoric and must be protected from oxidation by keeping it in an inert atmosphere or under a suitable liquid medium such as alcohol. The pyrophoric cobalt was now suspended with stirring in alcohol and a stream of hydrogen sulfide gas was bubbled through the solution which was cooled to maintain the temperature below 50° C. The hydrogen sulfide reacted rapidly with the cobalt metal with the liberation of hydrogen. When no more hydrogen was evolved the cobalt sulfide $$Co^* + H_2S \longrightarrow CoS + H_2 \text{ (see footnote)}$$

(In this and in subsequent equations the asterisk denotes the metal in an activated or pyrophoric condition and not in the ordinary form which does not undergo the reaction indicated under the conditions described herein.)

formed was filtered from the alcohol and washed with fresh alcohol to remove hydrogen sulfide. The final product was still pyrophoric and had to be protected from atmospheric oxidation. The weight ratio of cobalt to sulfur in the product was found to be 2.7. This corresponds approximately to the conversion of 70% of the cobalt to cobalt monosulfide. This product was very active for carrying out catalytic hydrogenation reactions as shown by the following experiment.

A solution of 75 parts of sodium para-toluene sulfinate in 150 parts of water was charged together with 15 parts of the sulfided cobalt catalyst described above, into a pressure autoclave and hydrogen charged into the autoclave to a pressure of 2300 lbs./sq. in. The autoclave was heated at 200° C. with suitable agitation for 3½ hrs. After cooling the autoclave, the contents were filtered from the catalyst. Acidification of the aqueous solution precipitated solid para-thiocresol in an amount corresponding to 50% of the theoretically possible yield. Some toluene and hydrogen sulfide was also formed.

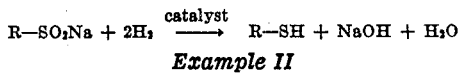

Example II

Another type of sulfactive catalyst was prepared as follows. Pyrophoric nickel-on-kieselguhr was prepared by reducing precipitated nickel carbonate-on-kieselguhr with hydrogen at a temperature of 425°–475° C. The cooled reduced pyrophoric material was then transferred without exposure to air to a saturated solution of sulfur in benzene. The catalyst was then stirred with the solution for several minutes at room temperature and then allowed to settle. The supernatant liquid was decanted and the nickel stirred with a second portion of benzene saturated with sulfur. After no more sulfur was taken up by the nickel-on-kieselguhr the product was filtered and washed with benzene to remove excess sulfur. Analysis showed that the catalyst had the composition, $NiS_{0.95}$+kieselguhr and that practically complete conversion of nickel to nickel sulfide had occurred.

$$Ni^* + S \longrightarrow NiS$$

The activity of the sulfided nickel so prepared was shown by the following experiment.

A benzene solution of 100 parts of crude alpha-naphthyl disulfide was charged into an autoclave together with 10 parts of the sulfided nickel-on-kieselguhr catalyst and the autoclave was charged with hydrogen to a pressure of 500 lbs./sq. in. On heating the autoclave to 150° C. the absorption of hydrogen commenced as evidenced by a decrease in the pressure. Additional hydrogen was added when the pressure had dropped to 200 lbs./sq. in. to replace that absorbed. After 3½ hours the total pressure drop was 600 lbs./sq. in. and no further reaction occurred. After filtering the catalyst from the solution and removal of the solvent by distillation, there was obtained a mixture of crude thionaphthols from which pure thio-alpha-naphthol was obtained by distillation.

Example III

The sulfiding treatment of finely divided active metals to obtain sulfactive catalysts may be carried out in the same equipment in which the catalyst is used for hydrogenation reactions as shown below.

Ten parts of freshly reduced pyrophoric nickel-on-kieselguhr in finely divided form was charged together with 5 parts of sulfur and 96 parts of crude naphthyl disulfides as in the preceding example. The autoclave was charged with hydrogen to a pressure of 500 lbs./sq. in. and heated to 100° C. during ½ hour to allow the metal to be converted to the metal sulfide. The temperature was then raised to 150° C. Rapid absorption of hydrogen ensued and after 3 hours no further reaction occurred. After cooling the autoclave and removing the catalyst, crude thionaphthol was obtained as before. The catalyst consisted of nickel sulfide-on-kieselguhr, the metallic nickel and the sulfur having reacted to form the active catalyst during the period of heating up the autoclave. These transformations may be formulated as follows:

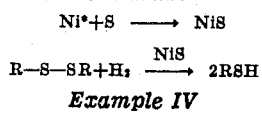

Example IV

An active molybdenum sulfide catalyst was prepared by the following procedure. Thirty-six parts of a finely ground alloy of equal weights of molybdenum and aluminum was suspended in 300 parts of boiling water and a solution of 130 parts of concentrated sulfuric acid in 100 parts of water was added slowly during one hour. After all of the acid had been added the mixture was digested further for 4 hours. The finely divided insoluble product was then filtered and washed free from acid and soluble salts. The molybdenum thus obtained was extremely pyrophoric and must be protected from the air. It was then transferred to methanol, and hydrogen sulfide gas was bubbled through the methanol suspension of the product for 8 hours at room temperature. The catalyst was filtered from the methanol solution and dried. Analysis showed the weight ratio of molybdenum to sulfur to be approximately 6:1. This product was an active hydrogenation catalyst as shown by the following experiment.

Fifteen parts of the sulfided molybdenum catalyst prepared as described above was charged, together with 100 parts of pentadecanone-8 and 33 parts of sulfur, into a high pressure autoclave. Hydrogen was admitted to a pressure of 3000 lbs./sq. in. and the autoclave heated to 120° C. After one-half hour the pressure had decreased 1100 lbs./sq. in. Thereafter the temperature of the autoclave was raised to 200° C. and after 5 hours no further absorption of hydrogen occurred. On cooling the autoclave, and removal of the catalyst, there was obtained on distillation pentadecanethiol-8 in 76% yield. This type of reaction is represented by the following equations.

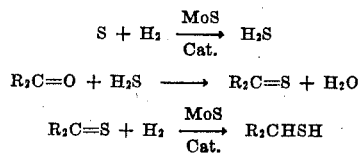

By way of contrast the above experiment was carried out under identical conditions except that 15 parts of a molybdenum trisulfide catalyst prepared by heating ammonium thiomolybdate was substituted for the sulfided molybdenum catalyst described above. After the reaction had ceased, the product was worked up as before and pentadecanethiol-8 was obtained in only 16% yield from the pentadecanone-8.

Example V

Pyrophoric finely divided molybdenum was prepared by treating an alloy of aluminum and molybdenum with sulfuric acid as described above under Example IV. The product so obtained was treated at room temperature with several portions of benzene saturated with sulfur until no more sulfur was taken up by the molybdenum. The sulfided molybdenum so obtained was an active hydrogenation catalyst, as shown by the following results.

A solution of 50 parts of sodium sulfite in 200 parts of water was charged into an autoclave together with 10 parts of the sulfided molybdenum catalyst described above. Hydrogen was admitted to the autoclave to a pressure of 1500 lbs./sq. in. and the autoclave heated to 125° C. After 2½ hrs. the pressure had dropped 500 lbs./sq. in. and the reaction was complete. On working up the reaction product sodium thiosulfate was obtained in practically quantitative yield.

$$2Na_2SO_3 + 2H_2 \xrightarrow{catalyst} Na_2S_2O_3 + 2NaOH + H_2O$$

Example VI

A finely divided alloy containing 25% of cobalt, 25% of molybdenum, and 50% of aluminum was suspended in boiling water and treated with a solution of sodium hydroxide. After the aluminum had been dissolved the finely divided product was filtered from the solution and washed several times with water. The active cobalt-molybdenum so obtained was then transferred to methanol and treated with hydrogen sulfide gas for several hours at room temperature. After there was no further evolution of hydrogen the product was filtered and washed with water. The catalyst so prepared was active in bringing about hydrogen reductions of which the following is an example.

A solution of 50 parts of sodium meta-bisulfite ($Na_2S_2O_5$) in 150 parts of water was charged into an autoclave together with 10 parts of the sulfided cobalt-molybdenum catalyst, and hydrogen was forced into the autoclave to a pressure of 1500 lbs./sq. in. The autoclave was heated to 75° C. and during 2 hours the pressure decreased 400 lbs./sq. in. Analysis of the reaction product indicated that the sodium metabisulfite had been hydrogenated almost quantitatively to sodium thiosulfate.

$$Na_2S_2O_5 + 2H_2 \xrightarrow{catalyst} Na_2S_2O_3 + 2H_2O$$

Example VII

Five grams of finely divided pyrophoric nickel prepared by reducing nickel chloride with a solution of sodium naphthalene was charged into an autoclave, together with 60 parts of sulfur and 90 parts of benzene. The autoclave was then charged with hydrogen to a pressure of 2200 lbs./sq. in. and heated to 100° C. during ½ hour to convert the pyrophoric nickel to the sulfide. The temperature was then raised to 125° C. A rapid exothermic reaction occurred as evidenced by the decrease in pressure. Reaction was complete in 2 hours. On examining the reaction product, it was found that all of the sulfur had been converted to hydrogen sulfide. The pyrophoric nickel had likewise been converted to nickel sulfide which catalyzes the hydrogenation reaction.

$$Ni^* + S \longrightarrow NiS \quad S + H_2 \xrightarrow[Cat.]{NiS} H_2S$$

Example VIII

Sixty parts of cyclohexanone and 35 parts of sulfur were charged into a pressure autoclave, together with 5 parts of finely divided pyrophoric iron prepared by extracting the aluminum from a finely powdered alloy of iron and aluminum with sodium hydroxide solution. Hydrogen was admitted to the autoclave to a pressure of 2000 lbs./sq. in. and the autoclave heated to 100° C. during ½ hour to convert the iron to the active sulfide catalyst. The temperature was then raised to 150° C. A rapid reaction ensued, as evidenced by the decrease in hydrogen pressure, and it was necessary to add hydrogen from time to time to maintain the total pressure in the range from 1000 to 2000 lbs./sq. in. The total pressure drop amounted to 1800 lbs./sq. in. in three hours. After cooling the autoclave and removal of the catalyst by filtration, cyclohexanethiol was isolated by distillation in an amount corresponding to 80% of the theoretically possible conversion from cyclohexanone. The sulfided catalyst was found to have a weight ratio of iron to sulfur of 1.73. The ratio calculated for FeS is 1.75.

The above experiment was carried out under identical conditions except that finely divided pyrophoric cobalt prepared from a cobalt-aluminum alloy by means of sodium hydroxide was substituted for the finely divided iron in the above example. In this way there was again obtained cyclohexanethiol in high yield.

Example IX

By way of contrast the above experiment was duplicated except that a cobalt sulfide catalyst prepared by the method disclosed in the patent literature was used.

Seventy-five parts of CP cobaltic oxide was heated in a stream of hydrogen sulfide at a temperature of 350° C. for 4 hours. The product was a dark grey, friable mass which was then finely pulverized before use. Five parts of the cobalt sulfide catalyst prepared in this manner was charged into an autoclave together with 60 parts of cyclohexanone and 30 parts of sulfur. The autoclave was agitated and hydrogen was introduced to a pressure of 2,000 lbs. per sq. in. The autoclave was then heated to a temperature of 150° C. for 3 hours, but during this period there was no apparent hydrogen absorption. The temperature was accordingly raised to 170° C. and the pressure decrease was only 400 lbs. in 3 hours. No further hydrogen absorption was noted. The contents of the autoclave were then filtered to separate the catalyst and worked up as described above. The amount of thiol obtained was only 0.022 moles, indicating that very little reaction had occured.

The metal sulfides prepared according to this invention are active, as I have shown, for the hydrogenation of sulfur compounds. These catalysts are, however, also active for hydrogenations that do not involve sulfur compounds, as shown by the following examples.

Example X

One hundred seventy-five parts of cottonseed oil were charged to an autoclave, together with 10 parts of sulfided cobalt catalyst prepared by treating finely divided pyrophoric cobalt with a benzene solution of sulfur at 25° C. until no further sulfidation occurred. Hydrogen was admitted to the autoclave to a pressure of 3000 lbs./sq. in. and the autoclave heated to 225° C. After one hour the absorption of hydrogen had ceased. On cooling the autoclave and filtering the hot reaction mixture, the product was found to be tristearin of melting point 62° C.

Example XI

By way of contrast, the above experiment was repeated using a cobalt sulfide catalyst prepared by the method described in the patent literature.

Sixty parts of cobalt nitrate hexahydrate was dissolved in 200 parts of water and stirred with an excess of ammonium sulfide solution. The black precipitate was filtered and washed free from soluble salts with water and then heated in a current of hydrogen sulfide at a temperature of 200° C. for 12 hours. The black powder was then finely ground. Fifteen parts of the cobalt sulfide prepared in this manner was charged into an autoclave with 150 parts of cottonseed oil. Hydrogen was then added to the autoclave to a pressure of 2,000 lbs. per sq. in. and the autoclave heated to a temperature of 200° C. for 4 hours with agitation. During this period very slight absorption of hydrogen was apparent. The contents of the autoclave were filtered from the catalyst. The product obtained in this manner was a liquid at ordinary temperatures. It had an iodine number of 89, indicating that very little hydrogenation had occurred.

Example XII

Fifty-four parts of p-benzoquinone, 100 parts of benzene solvent and 10 parts of sulfided cobalt catalyst prepared as described in Example I were charged into an autoclave, together with hydrogen at 2500 lbs./sq. in. pressure. On heating the autoclave to 125° C., the absorption of hydrogen commenced. After two hours, no further reaction occured. The cooled reaction mixture was filtered from the catalyst. Evaporation of the benzene solvent yielded crystalline hydroquinone.

Example XIII

Finely divided pyrophoric cobalt was treated several times at 25–30° C. with a saturated benzene solution of sulfur. The sulfided cobalt was filtered from the benzene solution and treated with 20 times its weight of boiling 10% aqueous sulfuric acid for 2 hours to dissolve any remaining metallic cobalt. The cobalt sulfide catalyst was then filtered and washed with water and finally with methanol.

One hundred parts of nitrobenzene dissolved in an equal weight of methanol was charged into a hydrogenation autoclave, together with 3 parts of sulfided cobalt catalyst prepared as described above. Hydrogen was admitted to the autoclave to a pressure of 1500 lbs./sq. in. and the autoclave heated to 125–150° C. Rapid absorption of hydrogen occurred and was completed after a few hours. The reaction product was aniline.

While I have indicated in the foregoing examples certain metals that may be sulfided to form active catalysts according to this invention the method may be applied with good results to other metals. In general, the common hydrogenating metals are suitable materials for preparing metal sulfide catalysts. For example, I may use besides the ferrous metals, other metals such as tungsten, chromium, cadmium, lead and palladium. These metals may likewise be used in combination with each other as suitable materials for preparing the sulfactive catalysts according to this invention. Several methods may be employed to obtain metals in sufficiently active form for use according to this invention. In general, any of the common methods used for preparing catalytically active or pyrophoric metals are suitable. Among such methods I may employ are (1) extraction of one or more components from an alloy of the desired metal under conditions such that the latter is not attacked; (2) reduction of a metal compound to the free metal by hydrogen or other reducing agents; or (3) thermal decomposition of relatively unstable metal salts such as formates and oxalates.

In preparing catalysts for use in liquid phase batch hydrogenation operations, it is preferable that the metal be in finely divided form so as to yield the metal sulfide in finely divided and active condition. If the catalysts are to be used for continuous hydrogenation reactions, then it is preferable that the metal sulfide be in rigid form, such as pellets, briquets, lumps, and the like. Such catalysts may be obtained by briquetting the finely divided metal sulfides. Alternatively, suitable rigid metal sulfides may be prepared according to this invention by treating lumped or pelleted forms having a surface of active metal with the sulfiding agent.

To effect the conversion of active metal to metal sulfide, I have referred to the use of sulfur and hydrogen sulfide. However, certain other divalent sulfur compounds may be substituted for these as, for example, cabon bisulfide and mercaptans. These compounds may be termed sulfiding agents. The sulfidation is carried out below 350° C. and generally below 150° C. because at the higher temperatures it is difficult to prevent local superheating of the catalyst surface due to the exothermic nature of the reaction of the active metal with the sulfiding agent. This results in sintering and loss of catalytic activity. I will usually operate at temperatures below 150° C. and preferably within the range from 25 to 100° C. After the catalyst is formed it is stable at temperatures much higher than can be used during the preparation of the metal sulfide. The sulfiding treatment may be carried out at atmospheric pressure or at higher pressures as I have illustrated in the foregoing examples. The treatment of active metals with sulfur compounds may be carried out in the absence of other materials, but it is preferable to carry out the reaction in the presence of a solvent or diluent for the sulfur compound, which serves to moderate the violence of the reaction and to maintain the temperature within the desired range. As examples of liquids that may be used in this connection, I may mention alcohols such as methanol and ethanol, ethers such as diethyl ether, hydrocarbons such as petroleum fractions, benzene and the like. Examples of diluents that may be used for gaseous sulfiding agents are nitrogen, hydrogen and carbon dioxide. The extent of the sulfiding treatment may vary, it being only necessary to convert the surface of the metal particles to the metal sulfide. In general, however, I prefer to continue the sulfiding treatment until no more sulfur is taken up by the metal. In many instances the sulfidation can be completed in less than one hour but longer periods of treatment may be required. As outlined in the foregoing examples, it is convenient in many cases to combine the sulfiding treatment with the actual use of the catalyst in a hydrogenation reaction, thus enabling both operations to be carried out in the same equipment. This is accomplished by charging the active metal and the sulfiding agent into the hydrogenation autoclave together with hydrogen and the material to be hydrogenated. The active metal will then be converted to the metal sulfide catalyst during the time in which the autoclave is heated to the desired hydrogenation temperature and the presence of the material to be hydrogenated will serve to moderate the sulfidation reaction and prevent overheating.

The metal sulfides prepared according to this invention may be used for catalytic hydrogenations in substantially pure form or they may constitute only a part of the entire catalyst and other materials as, for example, metals, metal oxides, or other compounds may be present. It is frequently desirable to extend the metal sulfide on an inert support such as kieselguhr, alumina, magnesia, silica gel, and the like. If it is desired to use pure metal sulfide, any unreacted metal or metal oxide that may be present can be removed usually by extracting the sulfided metal with dilute mineral or organic acids, as in many cases the metal sulfides are not attacked by dilute acid at moderate temperatures and do not lose catalytic activity by this treatment.

The use of metal sulfides prepared according to this invention as catalysts for hydrogenation reactions also constitutes a part of this invention.

The metal sulfides prepared according to this invention are used for catalyzing the hydrogen reduction of a variety of sulfur compounds. For example, organic disulfides, polysulfides, thioaldehydes, thioketones, sulfinic and sulfonic acid derivatives are hydrogenated to the corresponding thiols in the presence of these catalysts. The catalysts are likewise useful for the hydrogenation of nonsulfur unsaturated groups where sulfur or sulfur compounds are present that would poison the usual hydrogenating catalysts. As examples, there may be mentioned the hydrogenation of aldehydes and ketones to the corresponding alcohols, saturation of ethylenic and acetylenic derivatives and hydrogenation of nitro compounds to the corresponding amines. The catalysts are also useful for the hydrogenation of nitrates, nitrites, sulfites and bisulfites. Many of the metal sulfides prepared according to this invention are active catalysts even in the presence of acids and alkalis, and can therefore be used when acid or alkaline conditions exist during hydrogenation reactions.

The hydrogenation catalysts prepared by the method described herein have two important properties: (1) The catalysts are active at low temperatures; (2) the catalysts are immune to poisoning by sulfur or sulfur compounds. This combination of properties enables one to obtain a wide variety of valuable organic thiol compounds by simple and efficient catalytic processes where hitherto complicated procedures were generally required. The hydrogenation reactions can be effected using these catalysts so that simple hydrogen addition and hydrogen reduction takes place without disruptive side reactions occurring. Pure compounds can thus be obtained in high yields rather than complicated mixtures which require expensive refining operations.

It is apparent that many widely different embodiments of this invention may be made without departing from the spirit and scope thereof and therefore it is not intended to be limited except as indicated in the appended claims.

I claim:

1. The process for the preparation of a catalyst which comprises bringing a hydrogenating metal in a finely divided activated form into contact with a sulfiding agent under conditions providing for the removal of the heat of reaction so as to maintain the temperature of the reacting mass below 150° C., thereby forming a metal sulfide catalyst.

2. The process which comprises bringing into admixture a hydrogenating metal in finely divided activated form, a sulfiding agent, hydrogen, and a compound to be hydrogenated, elevating the temperature of said mixture until hydrogenation begins, thereby prior to said hydrogenation preforming in said mixture, under conditions providing for the removal of the heat of reaction so as to maintain the temperature of the reacting mass below 150° C., the sulfide of said metal in a catalytic form.

3. A metal sulfide hydrogenation catalyst that is active at relatively low temperatures and in the presence of sulfur containing compounds, said catalyst being identical with the product obtained by bringing a hydrogenating metal in finely divided activated form into contact with a sulfiding agent under conditions providing for the removal of the heat of reaction so as to maintain the temperature of the reacting mass below 150° C.

4. The process in accordance with claim 1 characterized in that the finely divided activated hydrogenating metal is obtained by the extraction of the other components of an alloy of the metal under conditions such that the said metal is not attacked.

5. The process in accordance with claim 1 characterized in that the finely divided activated hydrogenating metal is obtained by the reduction of a compound of the metal to the free metal by means of hydrogen.

6. The process in accordance with claim 1 characterized in that the finely divided activated hydrogenating metal is obtained by the thermal decomposition of a relatively unstable salt of the metal.

7. The process in accordance with claim 1 characterized in that after the metal sulfide catalyst is formed, any unreacted metal present in the catalytic mass is removed by treating said mass with a dilute acid under non-oxidizing conditions.

8. The process in accordance with claim 1 characterized in that the reaction is carried out in an inert liquid medium.

9. The process for the preparation of a catalyst which comprises bringing a hydrogenating metal in finely divided activated form, said metal being selected from the class consisting of iron, cobalt, nickel and molybdenum, into intimate contact with a sulfiding agent under conditions providing for the removal of the heat of reaction so as to maintain the temperature of the reacting mass below 150° C., thereby producing a metal sulfide catalyst.

10. The process in accordance with claim 9 characterized in that the sulfiding agent is selected from the group consisting of sulfur and hydrogen sulfide.

11. The process in accordance with claim 9 characterized in that the reaction is carried out at a temperature between 25° and 100° C.

FRANK KERR SIGNAIGO.